United States Patent
Konishi

(10) Patent No.: US 9,989,784 B2
(45) Date of Patent: Jun. 5, 2018

(54) OPTICAL QUANTIZER

(71) Applicant: OSAKA UNIVERSITY, Osaka (JP)

(72) Inventor: Tsuyoshi Konishi, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 0 days. days.

(21) Appl. No.: 15/554,300

(22) PCT Filed: Feb. 16, 2016

(86) PCT No.: PCT/JP2016/054376
§ 371 (c)(1),
(2) Date: Aug. 29, 2017

(87) PCT Pub. No.: WO2016/140048
PCT Pub. Date: Sep. 9, 2016

(65) Prior Publication Data
US 2018/0081202 A1    Mar. 22, 2018

(30) Foreign Application Priority Data

Mar. 5, 2015 (JP) ................................ 2015-044007

(51) Int. Cl.
*G02B 6/293* (2006.01)
*G02F 1/01* (2006.01)
*G02F 7/00* (2006.01)

(52) U.S. Cl.
CPC ............ *G02F 1/011* (2013.01); *G02B 6/2938* (2013.01); *G02F 7/00* (2013.01); *G02F 2203/26* (2013.01)

(58) Field of Classification Search
CPC ........ G02F 1/011; G02F 7/00; G02F 2203/26; G02B 6/2938
See application file for complete search history.

(56) References Cited

U.S. PATENT DOCUMENTS

| 6,219,172 B1 | 4/2001 | Yariv |
| 2001/0021059 A1 | 9/2001 | Yariv |

FOREIGN PATENT DOCUMENTS

| JP | 10-28055 | 1/1998 |
| JP | 2001-523849 | 11/2001 |
| WO | 99/26363 | 5/1999 |

OTHER PUBLICATIONS

International Search Report (ISR) dated May 17, 2016 in International (PCT) Application No. PCT/JP2016/054376.
(Continued)

*Primary Examiner* — John M Bedtelyon
(74) *Attorney, Agent, or Firm* — Wenderoth, Lind & Ponack, L.L.P.

(57) ABSTRACT

An optical quantizer including: a first shaping unit which performs at least intensity modulation of the sampling optical pulses using an analog signal to generate first optical pulses having a spectrum in which intensity is flat in a spectrum axis direction; a second shaping unit which performs spectrum shaping of the sampling optical pulses to generate second optical pulses having a spectrum in which intensity increases or decreases monotonously in the spectrum axis direction; a phase shifter which shifts a phase of optical pulses input to one of the first shaping unit and the second shaping unit so that a phase difference between the first optical pulses and the second optical pulses becomes a predetermined phase difference; an interference device which causes interference between the first optical pulses and the second optical pulses; and a wavelength demultiplexer which demultiplexes optical pulses output from the interference device into light of wavebands.

6 Claims, 6 Drawing Sheets

(56) References Cited

OTHER PUBLICATIONS

80C00 series optical sampling module data sheet for DSA8300 sampling oscilloscope, [online], latest update date: Sep. 16, 2019, 07:00:00, Tektronix, Inc., [searched on Feb. 1, 2015], Internet <URL:http://jp.tek.corn/datasheet/default-accessory-series-2>, with partial English translation.

G. C. Valley, "Photonic analog-to-digital converters", Optics Express 15.5, pp. 1955-1982, Mar. 5, 2007.

T. Satoh, et al., "Power-Saving Approach Toward 7-bit Optical Quantization for Photonic Analog-to-Digital Conversion", 2013 Conference on Lasers and Electro-Optics Pacific Rim (CLEO-PR), Jun. 30, 2013, TuO1-2.

ined States Patent US 9,989,784 B2

OPTICAL QUANTIZER

TECHNICAL FIELD

The present invention relates to optical quantizers, and in particular to an optical quantizer for an optical A/D converter which converts input analog signals into digital signals using sampling optical pulses.

BACKGROUND ART

Conventional A/D conversion techniques electrically achieve principal processing (sampling, quantization, and encoding) for converting analog signals into digital signals. Analog signals in the real world are processed using digital techniques in most cases. Thus, such A/D conversion techniques for converting analog signals into digital signals are essential in various fields. In particular, A/D conversion techniques are increasingly significant not only in the field of remote sensing (radar observation, astronomical observation, etc.) in which analog signals having extremely wide bands exceeding several tens of GHz but also in the field of information communication such as extremely wideband optical communication using 100 Gbps (Giga-bit per second). Thus, there is a demand for A/D converters which provide higher performances.

Today, there are electrical A/D converters that achieve a performance of approximately 100 Gsps (Giga-sample per second) at maximum, and each of these is configured by combining a plurality of A/D converters each providing a performance of approximately 10 Gsps. The performance of each of the electrical A/D converters depends on the performance of the 10-Gsps A/D converters which are base constituent elements. The A/D converters, however, have already reached a high degree of technical perfection, and it is difficult to achieve an ultra wideband exceeding the current ones due to problems of power consumption and time jitter during sampling.

In order to overcome these problems, converting A/D converters into optical A/D converters have been considered recently (see NPLs 1 and 2). NPLs 1 and 2 introduce a method for using non-linear optical effects such as self-frequency shifting or a method for parallel use of a plurality of optical active devices, as a method for converting the A/D converters into the optical A/D converters

CITATION LIST

Non Patent Literature

[NPL 1] 80C00 series optical sampling module data sheet for DSA8300 sampling oscilloscope, [online], latest update date: 2014-09-1607:00:00, TEKTRONIX, INC., [searched on Feb. 1, 2015], Internet <URL: http://jp.tek-.com/datasheet/default-accessory-series-2>

[NPL 2] G. C. Valley, "Photonic analog-to-digital converters." Optics Express 15.5 1955-1982 (2007)

SUMMARY OF INVENTION

Technical Problem

However, conventional optical quantizers place a restriction in the reduction of power consumption. In other words, the method for using the non-linear optical effects such as the self-frequency shifting require large power consumption enough to provide the non-linear optical effects. In addition, the method using a plurality of optical active devices or electronic devices (electrical ADCs etc.) in parallel requires large power consumption enough to operate the plurality of optical active devices or the electronic devices.

The present invention has been made in view of these problems, with an aim to provide an optical quantizer which achieves low power consumption.

Solution to Problem

In order to achieve the above-described object, an optical quantizer according to an aspect of the present invention is an optical quantizer for an optical A/D converter which converts an input analog signal into a digital signal using sampling optical pulses, the optical quantizer including: a first shaping unit configured to perform at least intensity modulation of the sampling optical pulses using the analog signal so as to generate first optical pulses having a spectrum in which intensity is flat in a spectrum axis direction; a second shaping unit configured to perform spectrum shaping of the sampling optical pulses so as to generate second optical pulses having a spectrum in which intensity increases or decreases monotonously in the spectrum axis direction; a phase shifter which is included in one of the first shaping unit and the second shaping unit, and shifts a phase of optical pulses input to the one of the first shaping unit and the second shaping unit so that a phase difference between the first optical pulses and the second optical pulses becomes a predetermined phase difference; an interference device which causes interference between the first optical pulses and the second optical pulses; and a wavelength demultiplexer which demultiplexes optical pulses output from the interference device into light of a plurality of wavebands.

In this way, the sampling optical pulses are subjected to intensity modulation using the input analog signal in the A/D conversion, and the first optical pulses having the spectrum in which intensity is flat in the spectrum axis direction and the second optical pulses having the spectrum in which intensity increases or decreases monotonously in the spectrum axis direction are interfered with each other with the predetermined phase difference (for example, 180 degrees), and the optical pulses are demultiplexed into the light of the plurality of wavebands.

Since first optical pulses and second optical pulses have the predetermined phase difference (for example, 180 degrees), in a waveband in which the intensity of the first optical pulses and the intensity of the second optical pulses are equal to each other, the intensity of the optical pulses after the interference reduces to the minimum (for example, zero). Thus, by means of identifying the waveband in which light having the smallest intensity is output among light demultiplexed into the plurality of wavebands, it is possible to identify the intensity of the second optical pulses corresponding to the waveband, that is, to identify the intensity of the first optical pulses. Accordingly, based on the intensity of the identified first optical pulses, it is possible to identify the intensity of the input analog signal considering the characteristics of the intensity modulation performed by the first shaping unit. In other words, position information indicating the waveband in which the light having the smallest intensity is output among the light demultiplexed into the plurality of wavebands (a digital value indicating one of the plurality of wavebands) is determined depending on the intensity of the input analog signal. Then, the A/D conversion is performed using the spectrum area.

In the optical quantization as such, a linear phenomenon (interference) which can be caused with small power is used without using non-linear optical effects which require large power. Furthermore, the optical quantization can be performed using an optical device such as a wavelength demultiplexer without using devices such as optical active devices and electronic devices which require large power. Thus, the optical quantizer which enables low power consumption is provided.

Here, the first shaping unit may further generate the first optical pulses by performing the spectrum shaping of the optical pulses obtained through the intensity modulation.

In this way, since the first shaping unit performs the spectrum shaping for generating the first optical pulses having the intensity spectrum in which intensity is flat in the spectrum axis direction, the A/D conversion can be performed even when the sampling optical pulses are not optical pulses having an intensity spectrum in which intensity is flat in the spectrum axis direction.

In order to achieve the above-described object, an optical quantizer according to an aspect of the present invention is an optical quantizer for an optical A/D converter which converts an input analog signal into a digital signal using sampling optical pulses, the optical quantizer including: a first shaping unit configured to perform at least intensity modulation of the sampling optical pulses using the analog signal so as to generate first optical pulses having a spatial intensity distribution in which intensity is flat in a spatial axis direction; a second shaping unit configured to perform spectrum shaping of the sampling optical pulses so as to generate second optical pulses having a spatial intensity distribution in which intensity increases or decreases monotonously in the spatial axis direction; a phase shifter which is included in one of the first shaping unit and the second shaping unit, and shifts a phase of optical pulses input to the one of the first shaping unit and the second shaping unit so that a phase difference between the first optical pulses and the second optical pulses becomes a predetermined phase difference; an interference device which causes interference between the first optical pulses and the second optical pulses; and a light detector which detects an intensity of optical pulses output from the interference device, in each of segment spaces in the spatial axis direction.

With this, the sampling optical pulses are subjected to the intensity modulation using the input analog signal in the A/D conversion, and the first optical pulses having the spatial intensity distribution in which intensity is flat in the spatial axis direction (for example, the X axis indicating the horizontal direction) and the second optical pulses having the spatial intensity distribution in which intensity increases or decreases monotonously in the spatial axis direction are interfered with each other with the predetermined phase difference (for example, 180 degrees). The optical pulses after the interference are demultiplexed into light in the plurality of segment spaces divided in the spatial axis direction, and the intensity of the light in each of the segment spaces is detected.

Since the first optical pulses and the second optical pulses have the predetermined phase difference (for example, 180 degrees), at the spatial position at which the intensity of the first optical pulses and the intensity of the second optical pulses are equal to each other, the intensity of the optical pulses after the interference reduces to the minimum (for example, zero). Thus, by means of identifying the segment space in which the light having the smallest intensity is output among the light divided into the plurality of segment spaces, it is possible to identify the intensity of the second optical pulses corresponding to the segment space, that is, to identify the intensity of the first optical pulses. Accordingly, based on the intensity of the identified first optical pulses, it is possible to identify the intensity of the input analog signal considering the characteristics of the intensity modulation performed by the first shaping unit. In other words, among the optical pulses divided into the plurality of segment spaces, position information indicating the segment space in which the light having the smallest intensity is output (a digital value indicating one of the plurality of segment spaces) is determined depending on the intensity of the input analog signal, and A/D conversion using the space area is performed.

In the optical quantization as such, a linear phenomenon (interference) which can be caused with small power is used without using non-linear optical effects which require large power. In addition, shaping of the space intensity distribution can be performed using optical devices such as optical filters without using devices such as optical active devices and electronic devices which require large power. Thus, the optical quantizer which enables low power consumption is achieved.

Here, the first shaping unit may further generate the first optical pulses by performing the shaping of the space intensity distribution of the optical pulses obtained through the intensity modulation.

In this way, the first shaping unit performs the space shaping for generating the first optical pulses having the space intensity distribution in which intensity is flat in the spatial axis direction. Thus, the A/D conversion can be performed even when the sampling optical pulses are not optical pulses having the space intensity distribution in which intensity is flat in the spatial axis direction.

It is to be noted that the predetermined phase difference may be approximately 180 degrees.

In this case, the first optical pulses and the second optical pulses having the phase difference of 180 degrees have the maximum degree of interference. Thus, either the wavelength demultiplexer or the optical detector can easily identify the position information with an increased accuracy.

Advantageous Effects of Invention

The present invention provides the optical quantizer which enables low power consumption.

More specifically, in order to overcome the restriction on the conventional electrical A/D converters, the present invention achieves optical quantization without increasing performances of non-linear devices and optical active devices. In this way, the optical quantizer according to the present invention easily reduces power consumption to one tenth of power consumption required for conventional optical quantizers. In addition, it is possible to reduce cost because there is no need to use optical active devices in parallel, a large economic effect can be provided.

In short, the present invention uses only an interference phenomenon which is a linear phenomenon without using non-linear optical effects. As a result, it is possible to easily reduce power consumption without increasing performances of and parallelization of non-linear devices, optical active devices, and electronic devices which have conventionally determined power consumption performances.

DESCRIPTION OF EMBODIMENTS

Hereinafter, an optical quantizer according to an aspect of the present invention is specifically described with reference to the drawings. Each of the embodiments described below indicates a general or specific example of the present invention. The numerical values, materials, constituent elements, the arrangement positions and connection forms of the constituent elements, processing order etc. in the following exemplary embodiments are mere examples, and therefore do not limit the scope of the present invention. In addition, among the constituent elements in the following exemplary embodiments, constituent elements not recited in any one of the independent claims that define the most generic concept are described as arbitrary constituent elements.

Embodiment 1

First, an optical quantizer according to Embodiment 1 of the present invention is described.

Figure 1:
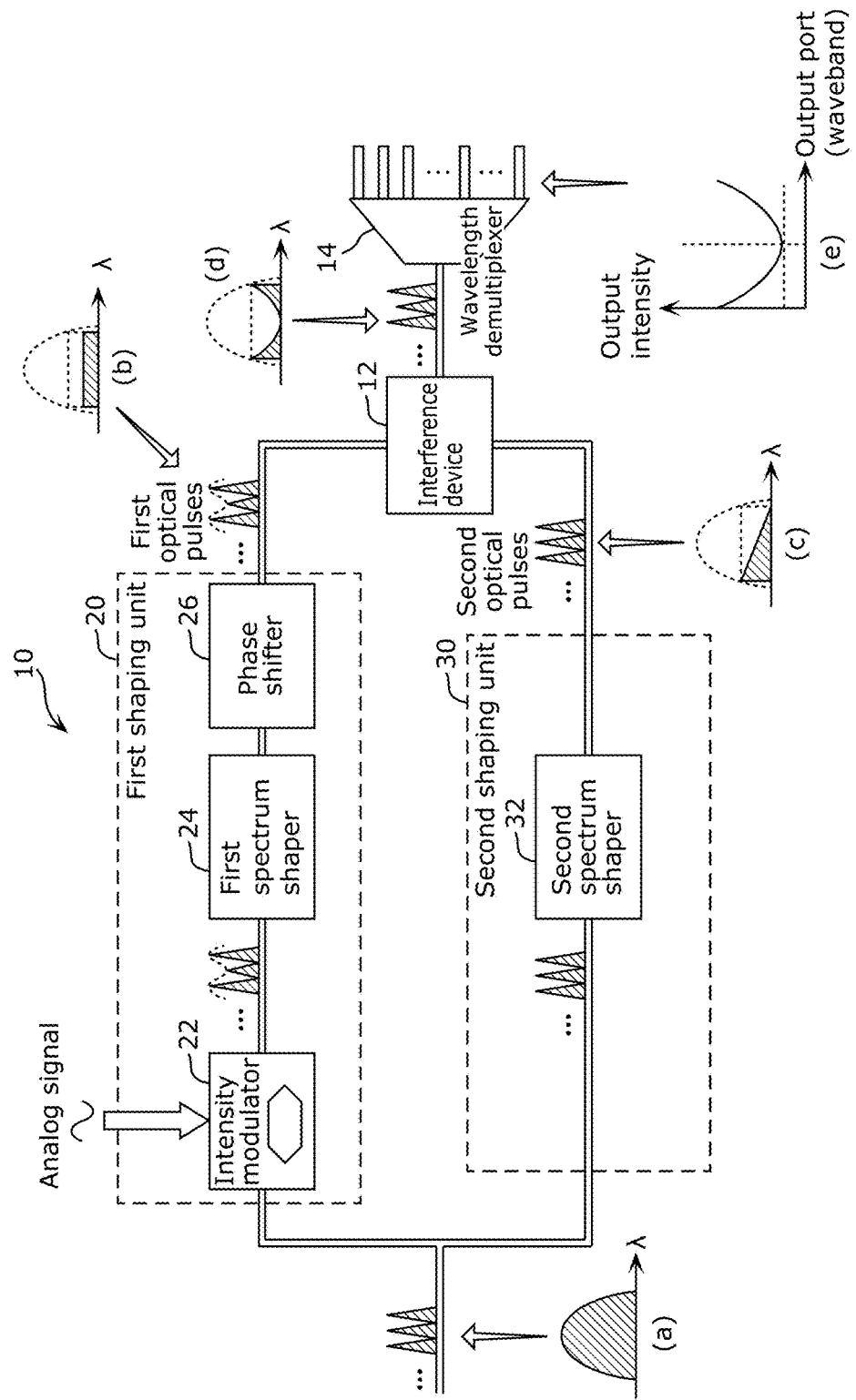
FIG. 1 is a block diagram indicating a configuration of an optical quantizer according to Embodiment 1 of the present invention.

FIG. 1 is a block diagram indicating a configuration of an optical quantizer 10 according to Embodiment 1 of the present invention. The optical quantizer 10 is an optical quantizer for an optical A/D converter which converts an input analog signal into a digital signal using sampling optical pulses, and has a characteristic for performing optical quantization using a spectrum area with a low power consumption. As illustrated in the diagram, the optical quantizer 10 includes a first shaping unit 20, a second shaping unit 30, an interference device 12, and a wavelength demultiplexer 14 as principal constituent elements. The respective constituent elements are connected by optical fiber cables, optical waveguides, or transmission media such as space and the like.

FIG. 1 illustrates schematic signal waveforms and spectra ((a) to (d) in FIG. 1) on main signal paths, and intensity distribution characteristics ((e) in FIG. 1).

Sampling optical pulses are, for example, an optical pulse train input at a repetition frequency of 100 GHz. The optical pulse train has a spectrum as illustrated in (a) of FIG. 1, is divided by an optical coupler or the like, and is input to the first shaping unit 20 and the second shaping unit 30.

The first shaping unit 20 is an example of a processing unit which performs at least intensity modulation of the input sampling optical pulses using the input analog signal in the A/D conversion so as to generate first optical pulses having a spectrum in which intensity is flat in a spectrum axis direction. In this embodiment, the first shaping unit 20 is configured with an intensity modulator 22, a first spectrum shaper 24, and a phase shifter 26.

It is to be noted that "a spectrum in which intensity is flat in a spectrum axis direction" is a spectrum having an intensity flatness within a range which has been determined according to a calculated accuracy of A/D conversion (conversion accuracy or the like) in a calculated waveband (for example, a waveband of sampling optical pulses). The spectrum is not always a spectrum in which intensity is linearly flat. A spectrum in which intensity (energy) in the above waveband falls within a range of ±6 dB from the center intensity (average intensity) is possible. A spectrum in which intensity (energy) in the above waveband falls within a range of ±3 dB from the center intensity (average intensity) is preferable. A spectrum in which intensity (energy) in the above waveband falls within a range of ±E % (E denotes 30, 20, 10 or the like) from the center intensity (average intensity) is more preferable.

The intensity modulator 22 is a modulator which performs intensity modulation of the input sampling optical pulses using the input analog signal in the A/D conversion, to generate optical pulses on which the analog signal has been superimposed. The intensity modulator 22 is, for example, a Mach-Zehnder optical intensity modulator. The Mach-Zehnder optical intensity modulator is of a type of optical modulators which change the intensity of transmitted light using electric signals. The Mach-Zehnder optical intensity modulator is a device which changes the intensity of light by changing the phase of light in optical waveguides by applying a voltage to two optical waveguides and multiplexing the waves of the light again so that the waves are interfered with each other.

The first spectrum shaper 24 is a spectrum shaper which performs spectrum shaping of the optical pulses output by the intensity modulator 22 to convert the optical pulses into optical pulses having a flat intensity in the spectrum axis direction. The first spectrum shaper 24 is, for example, implemented as an optical demultiplexer, a group of optical filters each of which allows light to pass through at a predetermined transmittivity for obtaining the flat spectrum, and an optical multiplexer which multiplexes optical pulses which have passed through the group of optical filters.

The phase shifter 26 is configured to shift the phase of optical pulses output from the first spectrum shaper 24 so that the first optical pulses output from the first shaping unit 20 and the second optical pulses output from the second shaper have a predetermined phase difference (here, 180 degrees). The phase shifter 26 is, for example, an optical fiber cable or an optical waveguide having a length corresponding to the phase of 180 degrees in the waveband of the optical pulses output from the first spectrum shaper 24 (more precisely, the center wavelength of the waveband).

The phase shifter 26 may be provided to the second shaping unit 30 instead of the first shaping unit 20. More specifically, the phase shifter 26 may be included in one of the first shaping unit 20 and the second shaping unit 30 as long as the phase shifter 26 shifts the phase of the optical pulses input to the one of the first shaping unit 20 and the second shaping unit 30 so that the first optical pulses output from the first shaping unit 20 and the second optical pulses output from the second shaping unit 30 have the predetermined phase difference (here, 180 degrees).

The second shaping unit 30 is an example of a processing unit which performs spectrum shaping of the input sampling optical pulses so as to generate second optical pulses having a spectrum in which intensity increases or decreases monotonously in the spectrum axis direction. The second shaping unit 30 includes the second spectrum shaper 32. The second spectrum shaper 32 is a spectrum shaper which performs spectrum shaping of the input sampling optical pulses so as to generate second optical pulses having a spectrum in which intensity increases or decreases monotonously in the spectrum axis direction. The second spectrum shaper 32 is, for example, configured with an optical demultiplexer, a group of optical filters each of which transmits light of each waveband after demultiplexing, at a predetermined transmittivity for obtaining a spectrum which increases or decreases monotonously, an optical multiplexer which multiplexes the respective optical pulses which have passed through the group of optical filters, or the like.

The spectrum whose intensity increases or decreases monotonously in the spectrum axis direction is, as illustrated in (c) of FIG. 1 for example, a spectrum having linear or curved intensity which increases or decreases monotonously between a maximum intensity (for example, 10V) and a minimum intensity (for example, 0 V) in an input range in the A/D conversion in a waveband of the sampling optical pulses. Here, "increases (or decreases) monotonously" in this embodiment may mean not only that intensity increases (or decreases) monotonously in a precise manner in the spectrum axis direction, but also, for example, that: an intensity (energy) in a waveband (for example, a waveband of sampling optical pulses) is calculated within a range of ±6 dB from an approximate straight line (or an approximate curved line) of a spectrum; an intensity (energy) in a waveband (for example, a waveband of sampling optical pulses) is preferably calculated within a range of ±3 dB from the approximate straight line (or an approximate curved line) of the spectrum; and an intensity (energy) in a waveband (for example, a waveband of sampling optical pulses) is more preferably calculated within a range of ±E % (E denotes 30, 20, 10 or the like) from the approximate straight line (or an approximate curved line) of the spectrum.

The interference device 12 is, for example, an optical coupler which causes interference between the first optical pulses to be output from the first shaping unit 20 and the second optical pulses to be output from the second shaping unit 30.

The wavelength demultiplexer 14 is an optical demultiplexer which demultiplexes optical pulses output from the interference device 12 into light of a plurality of wavebands. The wavelength demultiplexer 14 is, for example, an arrayed waveguide grating (AWG) having sixteen output ports (for demultiplexing the optical pulses into light of sixteen wavebands).

Next, a description is given of operations performed by the optical quantizer 10 according to this embodiment configured as described above.

The input sampling optical pulses are demultiplexed by an optical coupler, and are input to the intensity modulator 22 which constitutes the first shaping unit 20 and the second spectrum shaper which constitutes the second shaping unit 30. In this embodiment, each of optical pulses which constitute the sampling optical pulses has a bell-shaped spectrum as illustrated in (a) of FIG.

The intensity modulator 22 performs intensity modulation of the input sampling optical pulses using an input analog signal in A/D conversion, and outputs the modulated optical pulses to the first spectrum shaper 24.

The first spectrum shaper 24 performs spectrum shaping of the optical pulses output from the intensity modulator 22 to convert them into optical pulses having a spectrum in which intensity is flat in the spectrum axis direction, and outputs the converted optical pulses to the phase shifter 26.

The phase shifter 26 shifts the phase of the optical pulses output from the first spectrum shaper 24 by a predetermined phase so that the first optical pulses output from the first shaping unit 20 and the second optical pulses output from the second shaping unit 30 have a predetermined phase difference (here, 180 degrees), and outputs the optical pulses having the shifted phase as first optical pulses to the interference device 12.

Through the processing by the first shaping unit 20, the optical pulses output from the phase shifter 26, that is, the first optical pulses output from the first shaping unit 20 have a spectrum illustrated in (b) of FIG. 1. In other words, the first optical pulses have a spectrum including a flat area having a height corresponding to the intensity of the input analog signal in the waveband of the sampling optical pulses.

Meanwhile, in the second shaping unit 30, the second spectrum shaper 32 performs spectrum shaping of the input sampling optical pulses to convert the sampling optical pulses into an optical pulses having a spectrum in which intensity increases or decreases monotonously in the spectrum axis direction, and outputs the converted optical pulses as second optical pulses to the interference device 12. As a result, the second optical pulses output from the second shaping unit 30 have a spectrum as illustrated in (c) of FIG. 1. In other words, the second optical pulses have a spectrum in which intensity increases or decreases monotonously between the maximum intensity and the minimum intensity in the input range in the A/D conversion in the waveband of the sampling optical pulses.

The interference device 12 causes interference between the first optical pulses output from the first shaping unit 20 and the second optical pulses output from the second shaping unit 30, and outputs the first and second optical pulses to the wavelength demultiplexer 14. Here, since the first optical pulses and the second optical pulses have the predetermined phase difference (here, 180 degrees), the intensity of the optical pulses after the interference become the minimum (for example, zero) in the waveband in which the intensity of the first optical pulses and the intensity of the second optical pulses are equal to each other. Through the interference caused by the interference device 12, the first optical pulses having the spectrum illustrated in (b) of FIG. 1 and the second optical pulses having the spectrum illustrated in (c) of FIG. 1 are multiplexed and converted into optical pulses having a spectrum in which intensity is curved in a recessed manner as illustrated in (d) of FIG. 1. The converted optical pulses are input to the wavelength demultiplexer 14.

The wavelength demultiplexer 14 demultiplexes the input optical pulses into light of a plurality of wavebands. The intensity distribution characteristics in (e) of FIG. 1 illustrate an intensity distribution of light output from the wavelength demultiplexer 14. The horizontal axis shows wavebands (which are the positions of the output ports of the wavelength demultiplexer 14), and the vertical axis shows the intensity of the light output for each waveband. The optical pulses having a spectrum in (d) of FIG. 1 which have been input to the wavelength demultiplexer 14 are demultiplexed into light of different wavebands, and the light is output from each output port of the wavelength demultiplexer 14 according to the intensity distribution characteristics illustrated in the intensity distribution (e) of FIG. 1.

The waveband in which the light has the smallest-value intensity in the spectrum illustrated in (d) of FIG. 1 is identified by identifying the output port (that is, the waveband) through which the light having the smallest intensity is output, using a light detector, a comparator, or the like which detects the intensity of the light output from each output port of the wavelength demultiplexer 14. The identified waveband is a waveband in which the intensities of the first optical pulses and the second optical pulses having the predetermined phase difference (here, 180 degrees) are equal to each other. Thus, it is possible to identify the intensity of the second optical pulses corresponding to the waveband, that is, the intensity of the first optical pulses, and, based on the identified intensity of the first optical pulses, to identify the intensity of the input analog signal by considering characteristics of intensity modulation in the first shaping unit.

In other words, position information indicating the waveband in which the light having the smallest intensity is determined in the light demultiplexed into the plurality of wavebands by the wavelength demultiplexer 14, depending on the intensity of the input analog signal (each of the wavebands is an output port, and the position information is represented as a 4-bit digital value indicating one of the sixteen wavebands). Subsequently, A/D conversion using the spectrum area is performed.

Operations in the optical quantizer 10 as described above are repeated for each of the optical pulses which constitute the input sampling optical pulses. For example, the operations are repeated at 100 GHz. In this way, for example, the optical quantizer 10 having a 4-bit output resolution at 100 Gsps is implemented.

In this way, the optical quantizer 10 according to this embodiment uses a linear phenomenon (interference) which can be caused with small power without using non-linear optical effects which require large power. Furthermore, the optical quantizer 10 includes an optical device such as the wavelength demultiplexer 14 and the like without using devices such as optical active devices and electronic devices which require large power. Thus, the optical quantizer 10 according to the present invention operates with low power consumption compared to any optical quantizer which uses non-linear optical effects or a conventional optical quantizer which is connected in parallel to a plurality of optical active devices or a plurality of electronic devices.

Figure 2:
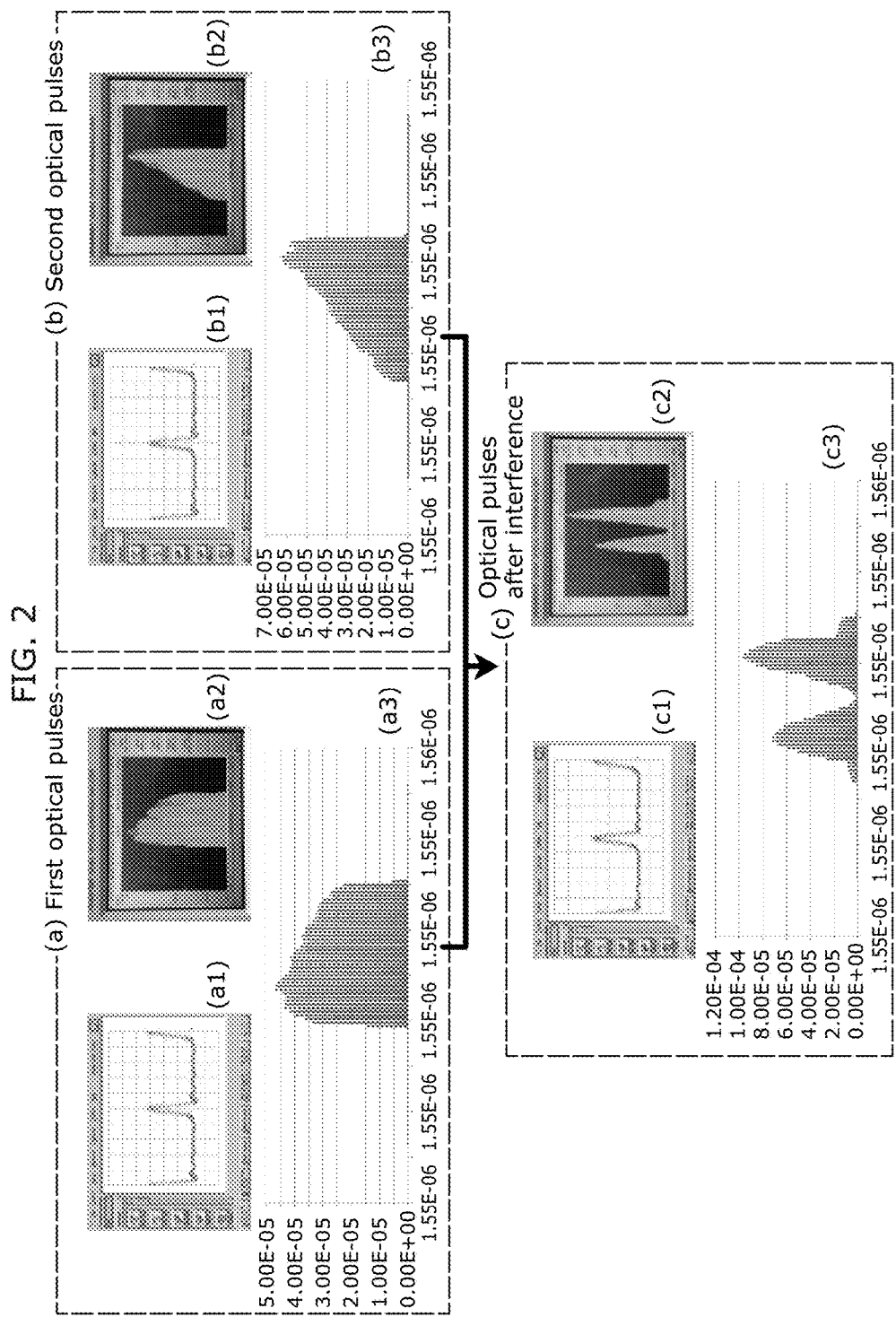
FIG. 2 is a diagram indicating results of experiments for checking operations performed by the optical quantizer.

FIG. 2 is a diagram indicating results of experiments for checking operations performed by the optical quantizer 10 according to this embodiment. In FIG. 2, (a) illustrates a waveform of the first optical pulses (a1) output from the first shaping unit 20, a spectrum (a2), and a spectrum (a3) obtained by enlarging the spectrum in (a2). In FIG. 2, (b) illustrates a waveform of the second optical pulses (b1) output from the second shaping unit 30, a spectrum (b2), and a spectrum (b3) obtained by enlarging the spectrum in (b2). In FIG. 2, (c) illustrates a waveform (c1) of the optical pulses after the interference output from the interference device 12, a spectrum (c2), and a spectrum (c3) obtained by enlarging the spectrum in (c2).

As known from the spectrum illustrated in (c3) of FIG. 2, the intensity is the smallest in the waveband (here, the center of the spectrum axis) corresponding to the intensity of the first optical pulses due to the interference between the first optical pulses and the second optical pulses. Accordingly, by means of the wavelength demultiplexer 14 identifying the waveband in which intensity becomes the smallest intensity, it is possible to identify the intensity of the first optical pulses, that is, the intensity of the input analog signal.

It is to be noted that, in this embodiment, the first shaping unit 20 is configured with the intensity modulator 22, the first spectrum shaper 24, and the phase shifter 26 connected in series in this listed order. However, the connection order of the intensity modulator 22, the first spectrum shaper 24, and the phase shifter 26 is not limited to the listed order, and may be any other connection order. For example, the first shaping unit 20 may be configured with the phase shifter 26, the first spectrum shaper 24, and the intensity modulator 22 connected in series in this listed order.

In addition, when the phase shifter 26 is provided not in the first shaping unit 20 but in the second shaping unit 30, any one of the phase shifter 26 and the second spectrum shaper 32 which constitute the second shaping unit 30 may be connected first (in processing order).

Figure 3:
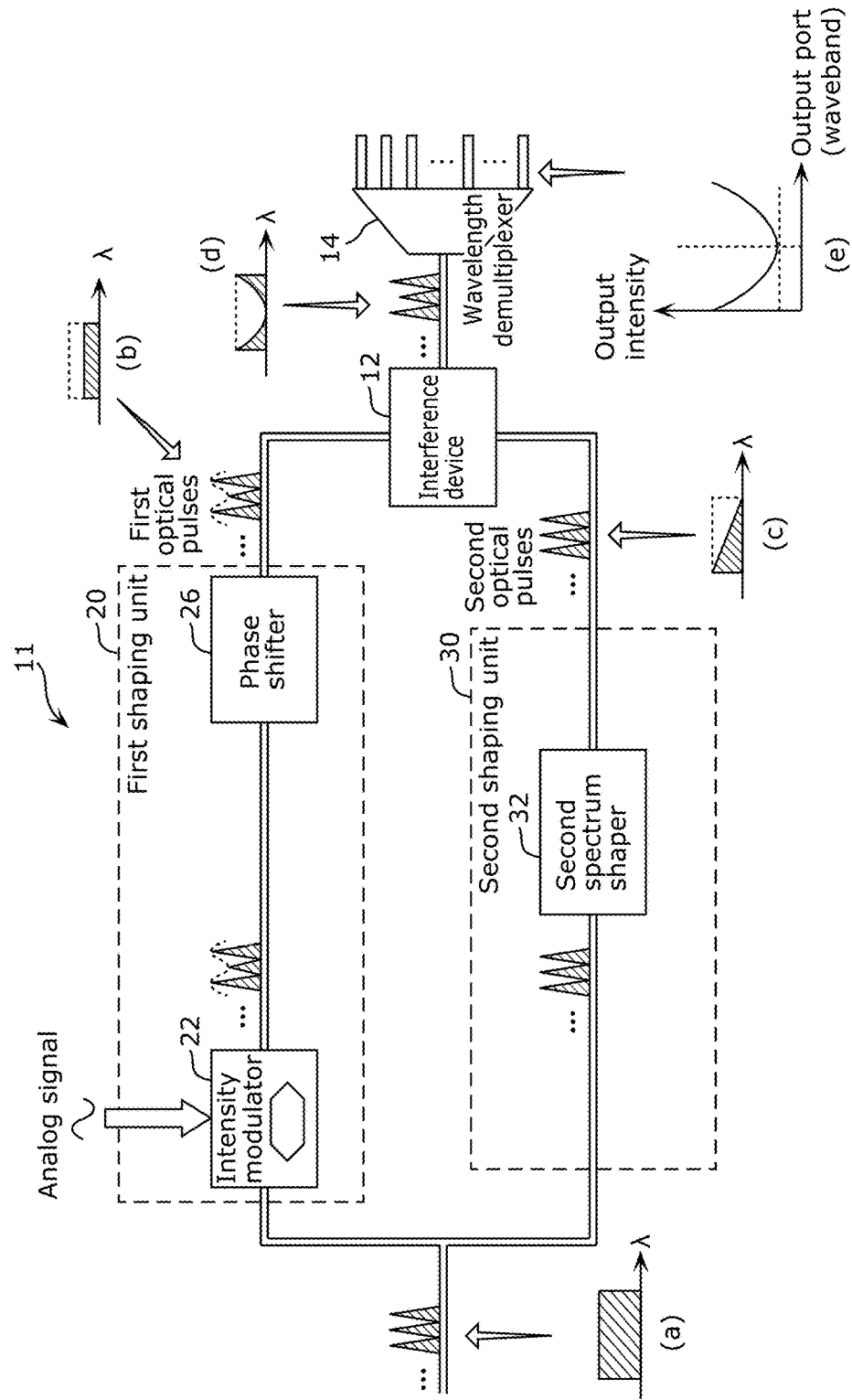
FIG. 3 is a block diagram indicating a configuration of an optical quantizer according to a variation of Embodiment 1.

In this embodiment, the first spectrum shaper 24 which flattens the spectrum is provided in the first shaping unit 20. However, as illustrated in FIG. 3, the first spectrum shaper 24 is unnecessary when each of the optical pulses of the sampling optical pulses has a flat spectrum. FIG. 3 is a block diagram indicating a configuration of an optical quantizer 11 according to a variation of Embodiment 1. The same constituent elements as those of the optical quantizer 10 illustrated in FIG. 1 are assigned with the same reference numerals. The optical quantizer 11 according to this variation is different from the optical quantizer 10 in the above embodiment only in that the first shaping unit 20 does not include the first spectrum shaper 24. In the case of the optical quantizer 11, as illustrated in (a) of FIG. 3, each of the optical pulses which constitute sampling optical pulses has a spectrum in which intensity is flat in a spectrum axis direction. Thus, in the optical quantizer 11 according to this variation, although the first shaping unit 20 does not include the first spectrum shaper 24, first optical pulses having a spectrum similar to that of the above embodiment is generated, signals similar to those of the above embodiment are output from the wavelength demultiplexer 14, and effects similar to those provided by the optical quantizer 10 according to the above embodiment are provided.

Embodiment 2

Next, an optical quantizer according to Embodiment 2 of the present invention is described.

Figure 4:
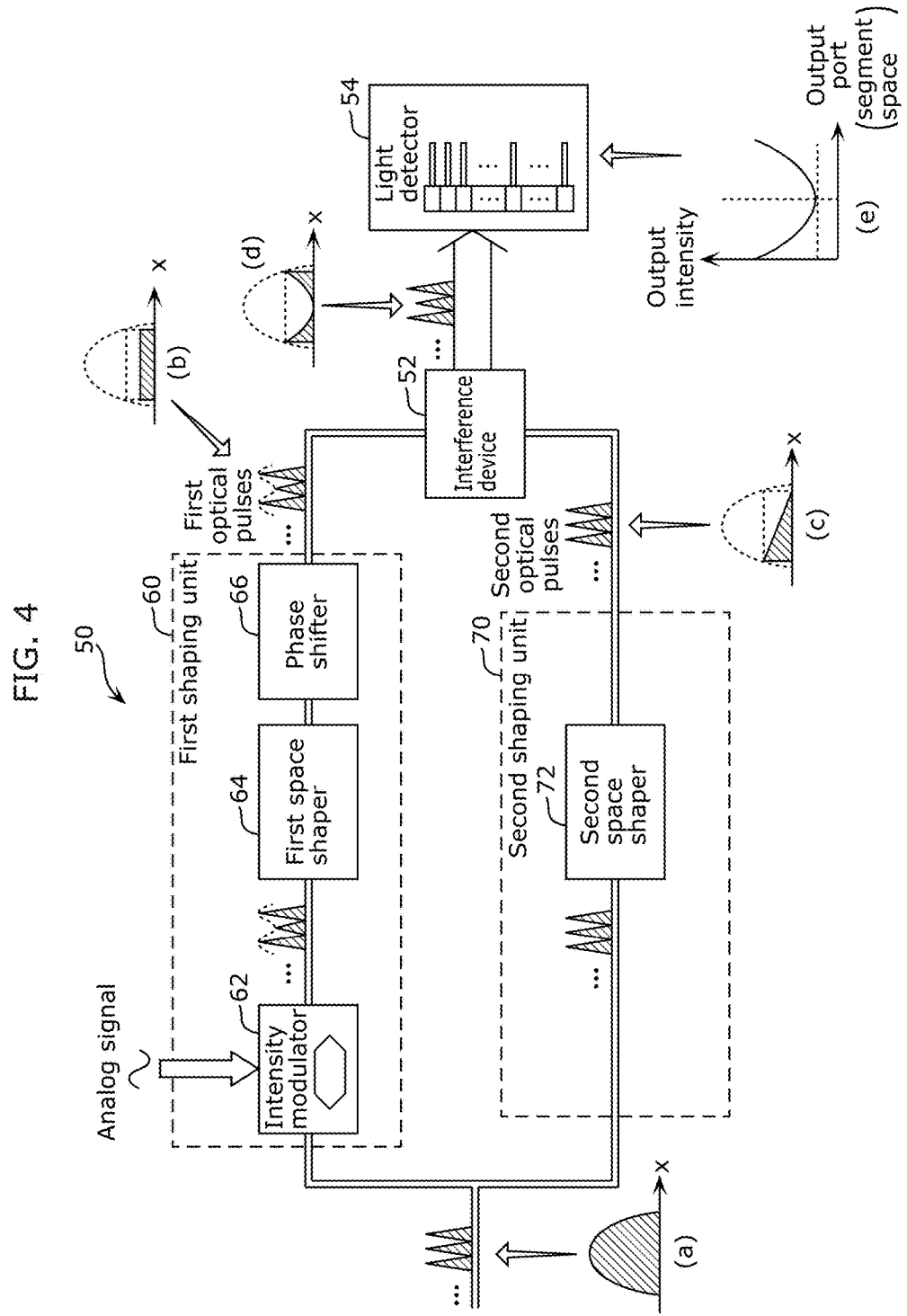
FIG. 4 is a block diagram indicating a configuration of an optical quantizer according to Embodiment 2 of the present invention.

FIG. 4 is a block diagram indicating a configuration of an optical quantizer 50 according to Embodiment 2 of the present invention. The optical quantizer 50 is an optical quantizer for an optical A/D converter which converts an input analog signal into a digital signal using sampling optical pulses, and has a characteristic for performing optical quantization using a space area with a low power consumption. In other words, the optical quantizer 50 according to this embodiment has a characteristic of performing optical quantization using a space area unlike Embodiment 1 in which optical quantization is performed using a spectrum area. As illustrated in the diagram, the optical quantizer 50 includes a first shaping unit 60, a second shaping unit 70, an interference device 52, and a light detector 54 as principal constituent elements. The respective constituent elements are connected by optical fiber cables, optical waveguides, or transmission media such as space and the like.

FIG. 4 illustrates schematic signal waveforms and space intensity distributions ((a) to (d) in FIG. 4) on main signal paths, and intensity distribution characteristics ((e) in FIG. 4).

Sampling optical pulses are, for example, an optical pulse train input at a repetition frequency of 100 GHz. The optical pulse train has a space intensity distribution as illustrated in (a) of FIG. 4, is divided by an optical coupler or the like, and is input to the first shaping unit 60 and the second shaping unit 70.

The first shaping unit 60 is an example of a processing unit which performs at least intensity modulation of the input sampling optical pulses using the input analog signal in the A/D conversion so as to generate first optical pulses having a spectrum in which intensity is flat in a space axis direction. In this embodiment, the first shaping unit 60 is configured with an intensity modulator 62, a first space shaper 64, and a phase shifter 66.

It is to be noted that the "spatial axis direction" is the direction of the axis which defines the plane intersecting the travel direction of the optical pulses, and is for example, the horizontal direction (X axis) orthogonal to the travel direction of the optical pulses. In addition, the "space intensity distribution in which intensity is flat in a spatial axis direction" is a space intensity distribution having an intensity flatness within a predetermined range according to A/D conversion accuracy (conversion accuracy etc.) to be calculated in a calculated space segment (for example, the range of a spatial axis of the sampling optical pulses). The "space intensity distribution in which intensity is flat in a spatial axis direction" is not necessarily a space intensity distribution in which intensity is linearly flat, and may be, for example, the following: a space intensity distribution in which intensity (energy) in a space segment is calculated within a range of ±6 dB from the center intensity (average intensity) of a spectrum; a space intensity distribution in which an intensity (energy) in a space segment is preferably calculated within a range of ±3 dB from the center intensity (average intensity); and a space intensity distribution in which intensity (energy) in a space segment is more preferably calculated within a range of ±E % (E denotes 30, 20, 10 or the like) from the center intensity (average intensity).

The intensity modulator 62 is a modulator which performs intensity modulation of the input sampling optical pulses so as to generate optical pulses on which the analog signal has been superimposed. The intensity modulator 62 is, for example, a Mach-Zehnder optical intensity modulator as in Embodiment 1.

The first space shaper 64 is a space shaper which performs shaping of the space intensity distribution for the optical pulses output from the intensity modulator 62 to convert the optical pulses into optical pulses having a space intensity distribution in which intensity is flat in a spatial axis direction. The first space shaper 64 is, for example, configured with an optical filter having a transmittivity pattern which corresponds to an intensity distribution in a spatial axis direction of input optical pulses (in such a manner that transmittivity decreases with increase in intensity). More specifically, the first space shaper 64 is, configured with glass on which a gray scale pattern corresponding to a transmittivity pattern is printed in the X-axis direction.

The phase shifter 66 is configured to shift the phase of optical pulses output from the first space shaper 64 so that the first optical pulses output from the first shaping unit 60 and the second optical pulses output from the second shaping unit 70 have a predetermined phase difference (here, 180 degrees). The phase shifter 66 is, for example, an optical fiber cable or an optical waveguide having a length corresponding to the 180-degree phase in the waveband of the optical pulses output from the first space shaper 64 (more precisely, the center length of the waveband).

The phase shifter 66 may be provided to the second shaping unit 70 instead of the first shaper 60. More specifically, the phase shifter 66 may be included in one of the first shaping unit 60 and the second shaping unit 70 as long as the phase shifter 66 shifts the phase of the optical pulses input to the one of the first shaping unit 60 and the second shaping unit 70 so that the first optical pulses output from the first shaping unit 60 and the second optical pulses output from the second shaping unit 70 have the predetermined phase difference (here, 180 degrees).

The second shaping unit 70 is an example of a processing unit which performs shaping of the space intensity distribution for the input sampling optical pulses so as to generate second optical pulses having a space intensity distribution in which intensity increases or decreases monotonously in a spatial axis direction. The second shaping unit 70 includes a second space shaper 72. The second space shaper 72 is a space shaper which performs shaping of a space intensity distribution for the input sampling optical pulses to generate second optical pulses having a space intensity distribution in which intensity increases or decreases monotonously in a spatial axis direction. The second space shaper 72 is, for example, configured with glass on which a gray scale pattern which gradually becomes lighter (or darker) in the X-axis direction is printed.

As illustrated in (c) of FIG. 4, the space intensity distribution in which intensity increases or decreases monotonously in the spatial axis direction is, for example, a space intensity distribution having a linear or curved intensity which increases or decreases monotonously between the maximum intensity (for example, 10 V) and the minimum intensity (for example, 0 V) in the input range in A/D conversion in the spatial axis range of the sampling optical pulses. Here, "increases (or decreases) monotonously" in this embodiment may mean not only that intensity increases (or decreases) monotonously in a precise manner in the spatial axis direction, but also, for example, that: an intensity (energy) in a space segment (for example, a spatial axis range of sampling optical pulses) is calculated within a range of ±6 dB from an approximate straight line (or an approximate curved line) of a space intensity distribution; an intensity (energy) in a space segment (for example, a spatial axis of sampling optical pulses) is preferably calculated within a range of ±3 dB from an approximate straight line (or an approximate curved line) of a space intensity distribution; and an intensity (energy) in a space segment (for example, a spatial axis of sampling optical pulses) is more preferably calculated within a range of ±E % (E denotes 30, 20, 10 or the like) from an approximate straight line (or an approximate curved line) of a space intensity distribution.

The interference device 52 is, for example, an optical coupler which causes interference between the first optical pulses to be output from the first shaping unit 60 and the second optical pulses to be output from the second shaping unit 70.

The light detector 54 is an optical intensity detector which detects, for the optical pulses output from the interference device 52, the intensity in each of a plurality of segment spaces divided in a spatial axis direction. The light detector 54 is, for example, a multi-photo detector in which sixteen light receiving elements for converting light into electric signals are arranged in a spatial axis (here, the X-axis), and has sixteen output ports which output the electric signals from the respective receiving elements.

Next, a description is given of operations performed by the optical quantizer 50 according to this embodiment configured as described above.

The input sampling optical pulses are demultiplexed by an optical coupler or the like, and are input to the intensity modulator 62 which constitutes the first shaping unit 60 and the second space shaper 72 which constitutes the second shaping unit 70. In this embodiment, each of optical pulses which constitute the sampling optical pulses has a bell-shaped space intensity distribution as illustrated in (a) of FIG. 4.

The intensity modulator 62 performs intensity modulation of the input sampling optical pulses using an input analog signal in A/D conversion, and outputs the modulated optical pulses to the first space shaper 64.

The first space shaper 64 performs shaping of a space intensity distribution for the optical pulses output from the intensity modulator 62 to convert the optical pulses into optical pulses having a space intensity distribution in which intensity is flat in a spatial axis (here, X-axis), and outputs the converted optical pulses to the phase shifter 66.

The phase shifter 66 shifts the phase of the optical pulses output from the first spectrum shaper 64 by a predetermined phase so that the first optical pulses output from the first shaping unit 60 and the second optical pulses output from the second shaping unit 70 have a predetermined phase difference (here, 180 degrees), and outputs the optical pulses having the shifted phase as first optical pulses to the interference device 52.

Through the processing by the first shaping unit 60, the optical pulses output from the phase shifter 66, that is, the first optical pulses output from the first shaping unit 60 has a space intensity distribution illustrated in (b) of FIG. 4. In other words, the first optical pulses have a space intensity distribution having a flat area at a height corresponding to the intensity of the input analog signal in the spatial axis (here, X-axis) range of the sampling optical pulses.

Meanwhile, in the second shaping unit 70, the second space shaper 72 performs shaping of a space intensity distribution for the input sampling optical pulses to convert the sampling optical pulses into optical pulses having a space intensity distribution in which intensity increases or decreases monotonously in the spatial axis direction (here, the X axis), and outputs the converted optical pulses as second optical pulses to the interference device 52. As a result, the second optical pulses output from the second shaping unit 70 have a space intensity distribution as illustrated in (c) of FIG. 4. In other words, the second optical pulses have the space intensity distribution in which intensity increases or decreases monotonously between the maximum intensity and the minimum intensity in the input range in A/D conversion in the spatial axis (here, the X axis) range of the sampling optical pulses.

The interference device 52 causes interference between the first optical pulses output from the first shaping unit 60 and the second optical pulses output from the second shaping unit 70, and outputs the first and second optical pulses to the light detector 54. Here, since the first optical pulses and the second optical pulses have the predetermined phase difference (here, 180 degrees), the intensity of the optical pulses after the interference becomes the minimum intensity at the position on the spatial axis (here, the X axis) at which the intensity of the first optical pulses and the intensity of the second optical pulses are equal to each other. Thus, through the interference caused by the interference device 52, the first pulses having the space intensity distribution illustrated in (b) of FIG. 4 and the second pulses having the space intensity distribution illustrated in (c) of FIG. 4 are multiplexed to convert these optical pulses into optical pulses having a space intensity distribution in which intensity is curved in a recessed manner as illustrated in (d) of FIG. 4. The converted optical pulses are input to the light detector 54.

The light detector 54 detects, for the optical pulses output from the interference device 52, the intensity in each of the plurality of segment spaces divided in the spatial axis (here, the X axis). The intensity distribution characteristics in (e) of FIG. 4 illustrate an intensity distribution of light output from the wavelength demultiplexer 54. The horizontal axis shows the positions of the plurality of segment spaces along the spatial axis (which are the positions of the output ports of the light detector 54), and the vertical axis shows the intensity of the light output for each segment space. The intensity of the optical pulses having the space intensity distribution (d) in FIG. 4 which have been input to the light detector 54 are detected for each segment space. Light is output from each output port of the light detectors 54 in such a manner of the intensity distribution characteristics illustrated in the intensity distribution (e) in FIG. 4.

Thus, the segment area in which the optical pulses have the smallest-value intensity in the space intensity distribution illustrated in (d) of FIG. 4 is identified by identifying an output port (that is, a segment space) in which light having the smallest-value intensity is output, using a comparator or the like which compares the magnitude of an electric signal output from each of the output ports of the light detector 54. The identified segment space is a position (segment area) on a spatial axis at which the intensities of the first optical pulses and the second optical pulses having the predetermined phase difference (here, 180 degrees) are equal to each other. Thus, it is possible to identify the intensity of the second optical pulses corresponding to the position, that is, the intensity of the first optical pulses, and, based on the identified intensity of the first optical pulses, to identify the intensity of the input analog signal by considering characteristics of intensity modulation in the first shaping unit.

In other words, position information indicating the segment space in which the light having the smallest intensity is output is determined, depending on the intensity of the input analog signal, in the light divided into a plurality of segment areas by the light detector 54 (the segment space is an output port, and the position information is represented as a 4-bit digital value indicating one of sixteen segment spaces (output ports)). Subsequently, A/D conversion using the segment space is performed.

Operations in the optical quantizer 50 as described above are repeated for each of the optical pulses which constitute the input sampling optical pulses. For example, the operations are repeated at 100 GHz. In this way, for example, the optical quantizer 50 having a 4-bit output resolution at 100 Gsps is implemented.

In this way, the optical quantizer 50 according to this embodiment uses a linear phenomenon (interference) which can be caused with small power without using non-linear optical effects which require large power. Furthermore, the optical quantizer 10 is configured with an optical device such as an optical filter and the like without using devices such as optical active devices and electronic devices which require large power. Thus, the optical quantizer 50 according to the present embodiment operates with low power consumption compared to any conventional optical quantizer which uses non-linear optical effects or a conventional optical quantizer which is connected in parallel to a plurality of optical active devices and electronic devices.

It is to be noted that, in this embodiment, the first shaping unit 60 is configured with the intensity modulator 62, the first spectrum shaper 64, and the phase shifter 66 connected in series in this listed order. However, the connection order of the intensity modulator 62, the first spectrum shaper 64, and the phase shifter 66 is not limited to the listed order, and may be any other connection order. For example, the first shaping unit 60 may be configured with the phase shifter 66, the first spectrum shaper 64, and the intensity modulator 62 connected in series in this listed order.

In addition, when the phase shifter 66 is provided in the second shaping unit 70, any of the phase shifter 66 and the second space shaper 72 in the second shaping unit 70 may be connected first (in processing order).

Figure 5:
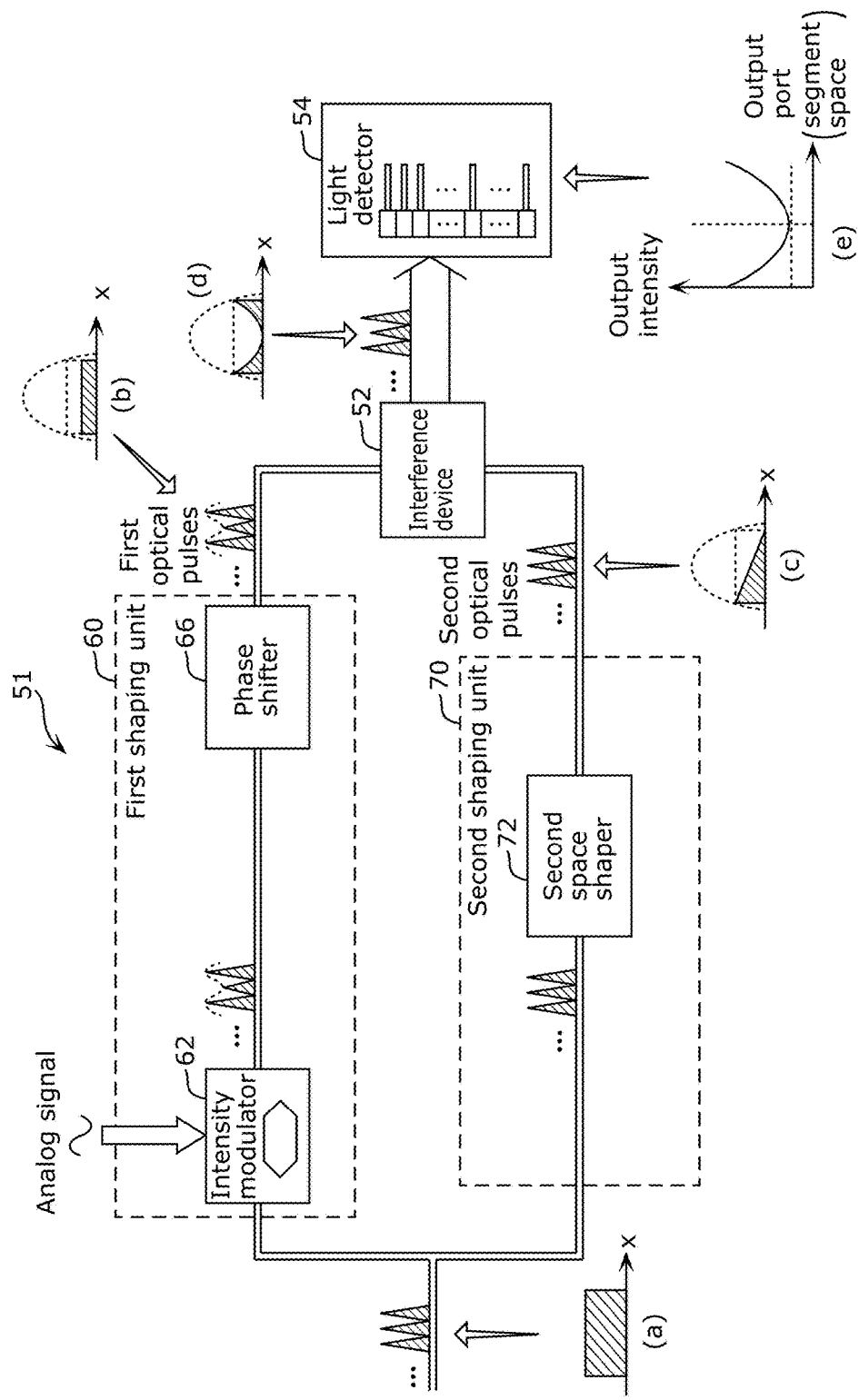
FIG. 5 is a block diagram indicating a configuration of an optical quantizer according to a variation of Embodiment 2.

In this embodiment, the first space shaper 64 which flattens a space intensity distribution is provided in the first shaping unit 60. However, as illustrated in FIG. 5, the first space shaper 64 is not necessary when each of the optical pulses which constitute sampling optical pulses has a flat space intensity distribution. FIG. 5 is a block diagram indicating a configuration of an optical quantizer 51 according to a variation of Embodiment 2. The same constituent elements as those of the optical quantizer 50 illustrated in FIG. 4 are assigned with the same reference numerals. The optical quantizer 51 according to this variation is different from the optical quantizer 50 in Embodiment 2 only in that the first shaping unit 60 does not include the first spectrum shaper 64. In the case of the optical quantizer 51, as illustrated in (a) of FIG. 5, each of the optical pulses which constitute the sampling optical pulses has a space intensity distribution in which intensity is flat in a spatial axis direction. Thus, in the optical quantizer 51 according to this variation, although the first shaping unit 60 does not include the first spectrum shaper 64, first optical pulses having a spectrum similar to the spectrum in Embodiment 2 are generated, a signal similar to the spectrum in Embodiment 2 is output from the light detector 54, and effects similar to those provided by the optical quantizer 50 according to Embodiment 2 are provided.

Although the optical quantizers according to the present invention have been described based on Embodiments 1 and 2 and the variations thereof, the present invention is not limited to these embodiments and variations. The present disclosure covers and encompasses embodiments that a person skilled in the art may arrive at by adding various kinds of modifications to any of the above embodiments or by arbitrarily combining some of the constituent elements in different embodiments and variations within the scope of the present invention.

For example, there is a conceivable case where signals having the same intensity are output from two adjacent output ports included in the output ports of the wavelength demultiplexer 14 according to Embodiment 1 and the light detector 54 in Embodiment 2. In this case, for example, it is only necessary to determine that the output port which has a larger waveband or spatial position is selected from among the two output ports which output the signals having the same intensity.

Figure 6:
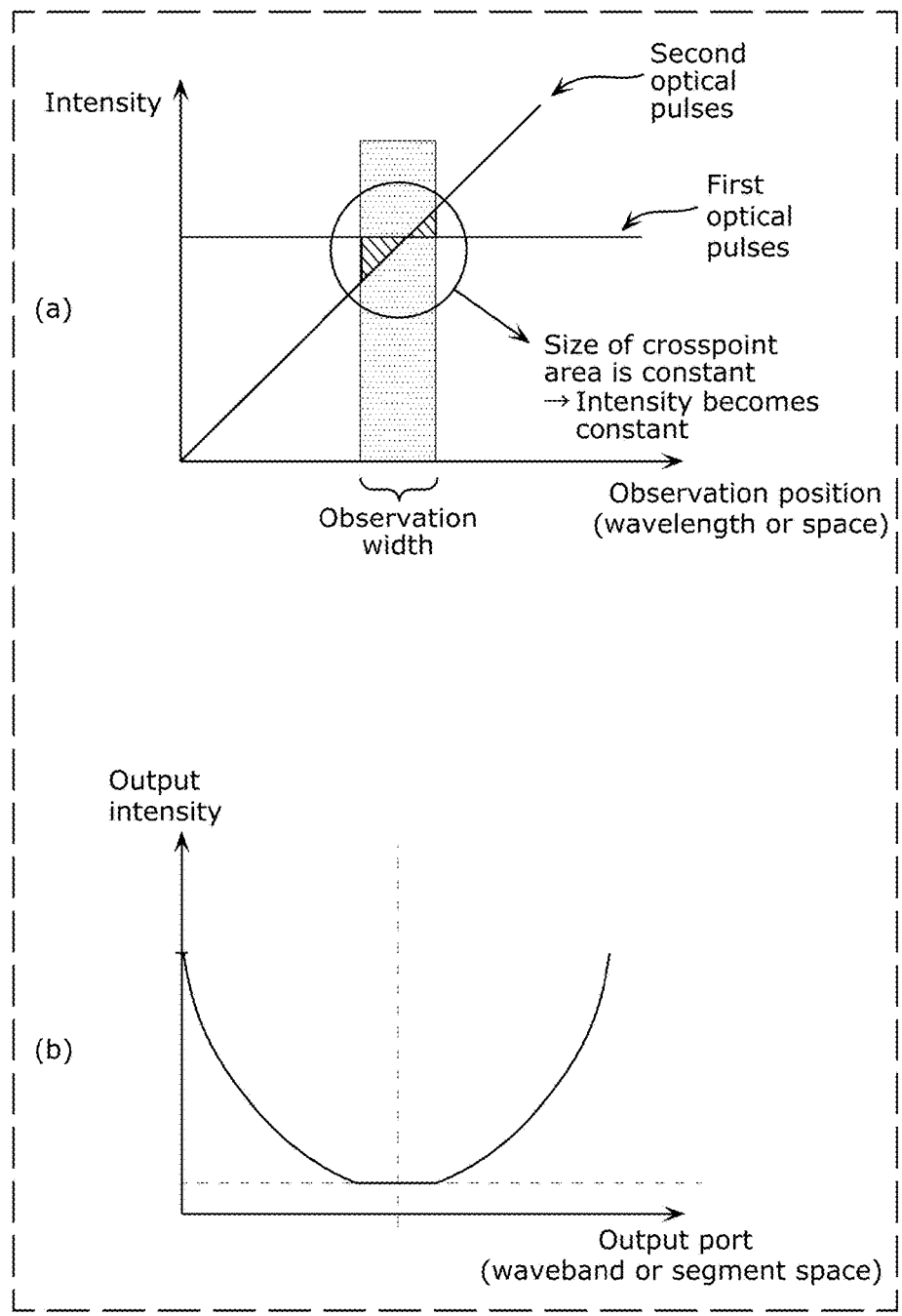
FIG. 6 is a diagram illustrating discrete output characteristics of the wavelength demultiplexer according to Embodiment 1 and the light detector according to Embodiment 2.

FIG. 6 is a diagram illustrating discrete output characteristics of the wavelength demultiplexer 14 and the light detector 54. In FIG. 6, (a) is a diagram illustrating intensity distributions of the first optical pulses and the second optical pulses (spectra and space intensity distributions; and (b) is a diagram (intensity distribution characteristics in the output ports of the wavelength demultiplexer 14 and the light detector 54) corresponding to (e) of FIG. 1 or (e) of FIG. 3.

As illustrated in (a) of FIG. 6, when a crosspoint of the intensity distribution of the first optical pulses and the intensity distribution of the second optical pulses is included in a certain observation width (a waveband or a segment space), it is possible to obtain discrete outputs from the output intensity (the area size in (a) of FIG. 6) in the observation width irrespective of the position of the crosspoint. As a result, as illustrated in (b) of FIG. 6, the intensity of the output signal in the observation width including the crosspoint indicates a minimum value, and thus is an output having a constant value irrespective of the position of the crosspoint included in the observation width. However, in (a) of FIG. 6, for example, when the intensity of an input analog signal further decreases, that is, when the intensity of the first optical pulses decreases, output intensities (the area sizes in (a) of FIG. 6) at two adjacent observation positions may be the same. In other words, when a crosspoint is positioned on a boundary of the observation width, output intensities (the area sizes in (a) of FIG. 6) at two observation widths positioned at both sides of the crosspoint are the same. In such a case, for example, it is only necessary to determine that the output port having the larger waveband or spatial position is selected from among the two output ports. In this way, even when signals having the same intensity are output from two adjacent output ports, one output port (one digital value) is reliably identified.

In Embodiments 1 and 2, the phase difference between the first optical pulses and the second optical pulses is set to 180 degrees. However, the phase difference is not limited thereto and may be approximately 180 degrees. For example, the phase difference may be within a range from 160 to 200 degrees, or within a range from 135 to 225 degrees. When the phase difference is closer to 180 degrees, the degree of interference between the first optical pulses and the second optical pulses is stronger, and thus the wavelength demultiplexer 14 and the light detector 54 can easily identify the position information. Considering this, it is good to determine a phase difference closer to 180 degrees according to a required accuracy of position information.

In Embodiments 1 and 2, the second optical pulses have a spectrum or a space intensity distribution which decreases monotonously and linearly. However, as long as the second optical pulses increase or decrease monotonously, a spectrum or space intensity distribution having any other shape is possible. The shape may be, for example, a curved shape such as a quadratic curve. At this time, it is preferable that the shape of the second optical pulses or the space intensity distribution be a shape in which the minimum point in the spectrum or the space intensity distribution of the first optical pulses and the second optical pulses after the interference is a sharper trough.

INDUSTRIAL APPLICABILITY

The present invention can be implemented as optical quantizers for optical A/D convertors, such as an optical quantizer used to perform A/D conversion of an analog signal having an ultra wideband exceeding several tens of GHz, a radar in remote sensing, a lidar, a radio telescope, and an ultra wideband A/D convertor for ultra wideband optical communication etc.

REFERENCE SIGNS LIST 10, 11, 50, 51 optical quantizer
12, 52 interference device
14 wavelength demultiplexer
20, 60 first shaping unit
22, 62 intensity modulator
24 first spectrum shaper
26, 66 phase shifter
30, 70 second shaping unit
32 second spectrum shaper
54 light detector
64 first space shaper
72 second space shaper

The invention claimed is:

1. An optical quantizer for an optical A/D converter which converts an input analog signal into a digital signal using sampling optical pulses, the optical quantizer comprising:

a first shaping unit configured to perform at least intensity modulation of the sampling optical pulses using the analog signal so as to generate first optical pulses having a spectrum in which intensity is flat in a spectrum axis direction;

a second shaping unit configured to perform spectrum shaping of the sampling optical pulses so as to generate second optical pulses having a spectrum in which intensity increases or decreases monotonously in the spectrum axis direction;

a phase shifter which is included in one of the first shaping unit and the second shaping unit, and shifts a phase of optical pulses input to the one of the first shaping unit and the second shaping unit so that a phase difference between the first optical pulses and the second optical pulses becomes a predetermined phase difference;

an interference device which causes interference between the first optical pulses and the second optical pulses; and a wavelength demultiplexer which demultiplexes optical pulses output from the interference device into light of a plurality of wavebands.

2. The optical quantizer according to claim 1, wherein the first shaping unit is configured to generate the first optical pulses by further performing spectrum shaping of optical pulses obtained through the intensity modulation.

3. The optical quantizer according to claim 2, wherein the predetermined phase difference is approximately 180 degrees.

4. An optical quantizer for an optical A/D converter which converts an input analog signal into a digital signal using sampling optical pulses, the optical quantizer comprising:

a first shaping unit configured to perform at least intensity modulation of the sampling optical pulses using the analog signal so as to generate first optical pulses having a spatial intensity distribution in which intensity is flat in a spatial axis direction;

a second shaping unit configured to perform spectrum shaping of the sampling optical pulses so as to generate second optical pulses having a spatial intensity distribution in which intensity increases or decreases monotonously in the spatial axis direction;

a phase shifter which is included in one of the first shaping unit and the second shaping unit, and shifts a phase of optical pulses input to the one of the first shaping unit and the second shaping unit so that a phase difference between the first optical pulses and the second optical pulses becomes a predetermined phase difference;

an interference device which causes interference between the first optical pulses and the second optical pulses; and a light detector which detects an intensity of optical pulses output from the interference device, in each of segment spaces in the spatial axis direction.

5. The optical quantizer according to claim 4, wherein the first shaping unit is configured to generate the first optical pulses by further shaping the space intensity distribution of optical pulses obtained through the intensity modulation.

6. The optical quantizer according to claim 5, wherein the predetermined phase difference is approximately 180 degrees.

* * * * *